United States Patent [19]

Fujinaka et al.

[11] Patent Number: 6,120,188

[45] Date of Patent: Sep. 19, 2000

[54] BEARING UNIT MANUFACTURING METHOD BEARING UNIT AND MOTOR USING THE BEARING UNIT

[75] Inventors: Hiroyasu Fujinaka; Shigeru Otsuka, both of Yonago, Japan

[73] Assignee: Matsushita Electric Industiral Co., Ltd., Japan

[21] Appl. No.: 09/094,560

[22] Filed: Jun. 15, 1998

[30] Foreign Application Priority Data

Jun. 19, 1997 [JP] Japan ..................................... 9-162260
Aug. 29, 1997 [JP] Japan ..................................... 9-234340

[51] Int. Cl.$^7$ ................................................... F16C 17/02
[52] U.S. Cl. ........................... 384/279; 384/293; 384/902
[58] Field of Search ..................................... 384/279, 113, 384/115, 114, 902, 293

[56] References Cited

U.S. PATENT DOCUMENTS

| 5,120,091 | 6/1992 | Nakagawa ............................... 384/279 |
| 5,120,140 | 6/1992 | Nakagawa et al. ..................... 384/279 |
| 5,282,688 | 2/1994 | Kanezaki et al. ....................... 384/279 |

FOREIGN PATENT DOCUMENTS

| 61-101124 | 5/1986 | Japan . |
| 62-167921 | 7/1987 | Japan . |
| 62-167922 | 7/1987 | Japan . |
| 3-107612 | 5/1991 | Japan . |
| 5-115146 | 5/1993 | Japan . |
| 5-180229 | 7/1993 | Japan . |
| 7-75284 | 3/1995 | Japan . |
| 7-241054 | 9/1995 | Japan . |
| 8-68423 | 3/1996 | Japan . |
| 9-200998 | 7/1997 | Japan . |
| 9-210067 | 8/1997 | Japan . |

Primary Examiner—Lenard A. Footland
Attorney, Agent, or Firm—Parkhurst & Wendel, L.L.P.

[57] ABSTRACT

An inexpensive bearing unit having a high rotational accuracy and a high reliability is provided for use in information and video-acoustic equipments. In the case of an oil-impregnated sintered bearing (1) in which an inner surface (2) sliding together with a shaft is formed on the bearing body (1) made of a porous sintered alloy, a plurality of concavities (4) are transferred to a tapered portion of the bearing inner surface (2) by forming a part or the whole of the inner surface (2) into a tapered shape or a tapered-like shape at the time of molding a green compact of the sintered alloy and press-fitting a pin (5) formed with protrusions (6) in the subsequent process and moreover, concavities (7) in which the shaft sliding surface is closed are formed by sizing the tapered portion straight at the time of sizing. Because the concavities (7) making a superior dynamic-pressure effect can be formed in a simple process, it is possible to provide an inexpensive bearing unit having a high rotational accuracy.

1 Claim, 20 Drawing Sheets

BEARING UNIT MANUFACTURING METHOD BEARING UNIT AND MOTOR USING THE BEARING UNIT

FIELD OF THE INVENTION

The present invention relates to a bearing unit used for information equipment and video-acoustic equipment and to a motor using the bearing unit.

BACKGROUND OF THE INVENTION

Because high-density recording of data by information equipment and video-acoustic equipment has recently been progressed as represented by a DVD (Digital Video Disk), higher rotational accuracy has also requested for motors used for these pieces of equipment. Therefore, higher rotational accuracy has also been requested for a bearing unit for supporting the rotary shaft of a motor.

Most conventional bearing units using oil-impregnated sintered bearings are constituted respectively with a bearing of which inner surface is machined into a complete circle and with a so-called journal bearing in which a completely-circular shaft rotates and slides. The oil-impregnated sintered bearing shows a preferable sliding characteristic because of the circulating action of oil referred to as a pump action or the wedge effect of oil both appearing when a shaft eccentrically rotates. However, the journal bearing has such a structural problem that no radius-directional pressure is produced unless the shaft is eccentric, posing a problem that whirling of a shaft increases and the rotational accuracy can hardly be secured.

To solve the problems of the oil-impregnated sintered bearing, the official gazette of Japanese Utility Model Application Laid-Open No. 61-101124 discloses a bearing in which a spiral groove is formed on the inner surface of the bearing to realize a high rotational accuracy by leading a lubricant to the inside according as a shaft rotates and to reduce energy loss. Moreover, machining of grooves is facilitated because the bearing is made of a sintered metal and cost-savings can be realized. In addition, the official gazettes of Japanese Patent Application Laid-Open Nos. 62-167921 and 62-167922 disclose a bearing having a combination of three or more circular-arc planes having a curvature larger than a circular-arc plane about the shaft core on the inner periphery of the bearing and an inner surface whose circular-arc plane is flat, in which friction loss can be reduced because the bearing line-contacts the shaft. Moreover, the bearing disclosed in the official gazette of Japanese Patent Application Laid-Open No. 5-115146 is an oil-impregnated sintered bearing substantially having a plurality of rectangular grooves on the inner surface, which improves the dynamic pressure function and reduces noises and abrasion by a simple structure.

As described above, each of the already-disclosed arts reduces a fluid resistance without increasing a clearance for supporting a shaft by forming a groove on the inner surface of a bearing correspondingly to increase the fluid resistance of a fluid lubricant due to decrease of the clearance or increase of revolution speed. Moreover, each of the arts improves the bearing rigidity of a bearing support portion and the rotational accuracy by the dynamic pressure effect of a groove portion in accordance with the decrease of the fluid resistance.

The above structure makes it possible to obtain the effect for holding a shaft at the center by the dynamic pressure mechanism of a bearing. However, the structure has problems that the pressure nearby both ends of the bearing lowers which is important to control the whirling of the bearing because a lubricant leaks to the outside of the bearing sliding surface, the shaft whirling control effect is insufficient, and the rotational accuracy cannot be easily secured.

Moreover, as described above, because the lubricant nearby both ends of a bearing leaks to the outside of the bearing sliding surface in the case of a conventional bearing, the effect for holding a shaft at the center is also decreased. Furthermore, because it is requested to decrease a motor in size and thickness as equipment is downsized, when the length of a bearing is decreased, the influence of decreased bearing length particularly remarkably appears. In the case of examples in which characteristics of a journal bearing are studied in detail, some research results are reported that, when the ratio of a bearing length to a bearing diameter becomes 1, the dynamic pressure effect of a bearing is decreased up to approximately ½ when compared to the case in which the bearing is long. In this case, it is difficult to control shaft whirling and moreover, it is difficult to keep a necessary performance also from the viewpoint of the reliability of a bearing.

DISCLOSURE OF THE INVENTION

The present invention is made to solve the conventional problems and its object is to provide an inexpensive bearing unit having a high rotational accuracy.

To solve the above problems, the present invention forms a concavity both ends of which are closed on the sliding surface of a shaft by forming a part or the whole of the above inner surface into a tapered shape or a shape similar to the tapered shape when molding a sintered alloy into a green compact, transferring a plurality of concavities to the tapered portion of the inner surface of the bearing, and sizing the tapered portion straight in a sizing process. Thus, because a concavity making a superior dynamic-pressure effect can be formed through a simple process, it is possible to provide an inexpensive bearing unit having a high rotational accuracy.

Moreover, instead of the above method of press-fitting a pin formed with protrusions in the subsequent process to transfer a plurality of concavities to the tapered portion of the inner surface of a bearing, the present invention provides a tapered sintered alloy having a plurality of concavities formed at a same time by forming protrusions on an internal pin of a mold at the time of molding a green compact in the preceding process, said sintered alloy being subjected to a similar machining thereafter. Since the pin press-fitting process is unnecessary, it is possible to provide a more inexpensive bearing unit.

The invention of a first embodiment is a method for manufacturing an oil-impregnated sintered bearing constituted by forming an inner surface sliding together with a shaft on a bearing body made of a porous sintered alloy, comprising: the step of forming a part or the whole of said inner surface into a tapered or tapered-like shape at the time of molding the sintered alloy into a green compact; the step of transferring a plurality of concavities to the tapered portion of the inner surface by press-fitting a pin formed with protrusions in the subsequent process; and the step of forming a plurality of concavities both ends of which are closed on the sliding surface of the shaft by sizing the tapered portion straight at the time of sizing. Therefore, the invention of the first embodiment makes it possible to form a concavity making a superior dynamic-pressure effect in a simple process and provide an inexpensive bearing unit having a high rotational accuracy.

The invention of another embodiment is a method for manufacturing an oil-impregnated sintered bearing constituted by forming an inner surface sliding together with a shaft on a bearing body made of a porous sintered alloy, comprising: the step of forming a part or the whole of the inner surface into a tapered or tapered-like shape at the time of molding a green compact of a sintered alloy; the step of forming convexities on a part or the whole of the circumference of the tapered portion; the step of transferring a plurality of concavities to the tapered portion of the inner surface by press-fitting a pin formed with protrusions in the subsequent process; the step of forming a plurality of concavities both ends of which are closed on the sliding surface of the shaft by sizing the tapered portion straight at the time of sizing; and the step of crushing the convexities at the time of transferring or sizing, so that the surface porosity of said portion is lowered. Therefore, the invention of makes it possible to form a concavity making a superior dynamic-pressure effect in a simple process and provide an inexpensive bearing unit having a high rotational accuracy.

The invention of a third embodiment is a method for manufacturing an oil-impregnated sintered bearing constituted by forming an inner surface sliding together with a shaft on a bearing body made of a porous sintered alloy, comprising: the step of forming a part or the whole of the inner surface into a tapered or tapered-like shape at the time of molding a green compact of a sintered alloy; the step of forming concavities on a part or the whole of the circumference of the tapered portion; the step of transferring a plurality of concavities to the inner-surface tapered portion by press-fitting a pin formed with protrusions in the subsequent process; and the step of forming a plurality of concavities both ends of which are closed on the sliding surface of the shaft by sizing the tapered portion straight at the time of sizing; and the step of crushing the concavity and its vicinities at the time of transferring or sizing, so that the surface porosity of the concavity is increased compared to that of the surroundings thereof. Therefore, the invention of makes it possible to form a concavity making a superior dynamic-pressure effect in a simple process and provide an inexpensive bearing unit having a high rotational accuracy.

Therefore, the invention of in the first three embodiments is a bearing unit manufactured by the method which makes it possible to provide an inexpensive bearing unit having a high rotational accuracy.

The invention of a forth embodiment is the bearing unit according to the first three embodiments, wherein the pores in the concavities formed in the inner surface of a bearing are so distributed that the surface porosity on the positive pressure side is smaller than the surface porosity on the negative pressure side. Therefore, the invention of the first three embodiments has a function for further improving the dynamic-pressure effect of the bearing.

The invention of a fifth embodiment is the bearing unit according to any one of claims of the first four embodiments, wherein a groove is formed on the outer surface of a bearing at the time of molding a green compact. Therefore, the invention of the fifth embodiment can be used for positioning in the subsequent process or has an advantage of improving the reliability because the invention plays a role of air release or the like when used in an equipment.

The invention of a sixth embodiment is the bearing according to the fifth embodiment, wherein the groove formed on the outer surface of the bearing is asymptotically decreased in width and/or depth toward the high-load-side end. Therefore, the invention has a function for improving the reliability of the bearing.

The invention of a seventh embodiment is the bearing unit according to any one of the first six embodiments, wherein two or more sliding surfaces are integrally formed in a single bearing by forming in the inner surface of the bearing a middle run-off having a inside diameter larger than that of each sliding surface. Therefore, the invention has advantages that a stable performance can be obtained compared to the case of using two or more bearings, thus improving the reliability of the bearing.

The invention of an eighth embodiment is the bearing unit according to the first seven embodiments wherein a plurality of sliding surfaces formed on the inner surface of a bearing are different from each other in axial length. Therefore, the invention makes it possible to provide a bearing unit realizing a high reliability, high rotational accuracy, and low shaft loss torque at a high level.

The invention of a ninth embodiment is the bearing unit according to any one of the first eight embodiments, wherein a plurality of concavities are formed in the inner surface of a bearing and the concavities differ from each other in shapes depending on their location. Therefore, the invention makes it possible to provide a bearing unit realizing a high rotational accuracy and low shaft loss torque at a high level.

The invention of a tenth embodiment is the bearing unit according to any one of the first nine embodiments, wherein the number of concavities formed in the inner surface of a bearing and arranged in the rotational direction differs depending on the place. Therefore, the invention makes it possible to provide a bearing unit realizing a high rotational accuracy and low shaft loss torque at a high level.

The invention of an eleventh embodiment is the bearing unit according to any one of the first ten embodiments, wherein the number of concavities formed in the inner surface of a bearing and arranged in the rotational direction is a prime number of 3 or more. Therefore, the invention makes it possible to control the resonation of a shaft and improve the rotational accuracy.

The invention of a twelfth embodiment is the bearing unit according to any one of the first eleven embodiments, wherein the pores in concavities formed in the inner surface of a bearing are distributed to adjust the surface porosity between 2% and 30%. Therefore, the invention makes the dynamic pressure effect of a bearing to effectively work.

The invention of a thirteenth embodiment is the bearing unit according to any one of the first twelve embodiments, wherein the depth of a concavity formed in the inner surface of a bearing is set to a value between 2 and 100 $\mu$m. Therefore, the invention makes the dynamic pressure effect of a bearing to effectively work.

The invention of a fourteenth embodiment is bearing unit comprising an oil-impregnated sintered bearing constituted by forming an inner surface sliding together with a shaft on a bearing body made of a porous sintered alloy, characterized in that: a part or the whole of said inner surface is formed into a tapered or tapered-like shape at the time of molding a green compact of the sintered alloy; a plurality of concavities are formed in the tapered portion; and a plurality of concavities both ends of which are closed are formed on the sliding surface of the shaft by sizing the tapered portion straight at the time of sizing. Therefore, the invention makes it possible to provide an inexpensive bearing unit having a high rotational accuracy.

The invention of a fifteenth embodiment is the bearing unit wherein part of an inner pin of a mold for molding a green compact is formed into a tapered or tapered-like shape, and a plurality of protrusions are formed on said tapered portion to a height in a range not exceeding the larger outside diameter of the same tapered portion, whereby the shape of said inner pin is transferred to the bearing body to form the concavities in the inner surface of the bearing at the time of green-compact molding. The invention shows the method for forming said concavities.

The invention of a sixteenth embodiment is a motor provided with the bearing unit according to any one of the thirteenth through fifteenth embodiments. The invention makes it possible to provide an inexpensive motor having a high rotational accuracy.

DESCRIPTION OF THE PREFERRED EMBODIMENTS

Preferred embodiments of the present invention are described below by referring to the accompanying drawings.

(Embodiment 1)

Figure 1A:
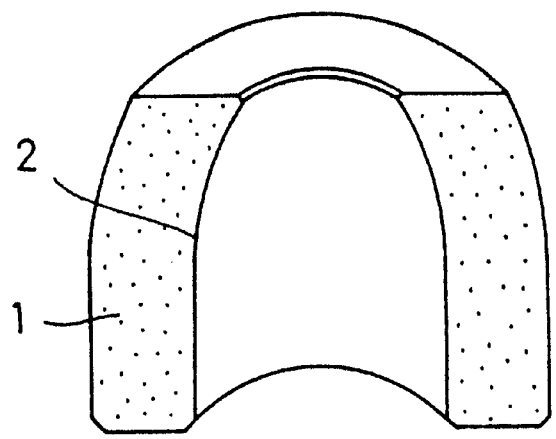
FIGS. 1a to 1c are sectional perspective views showing a bearing unit of embodiment 1 of the present invention.
Figure 1B:
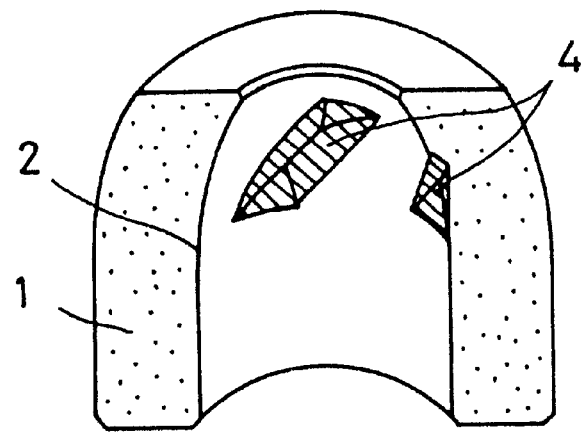
Figure 1C:
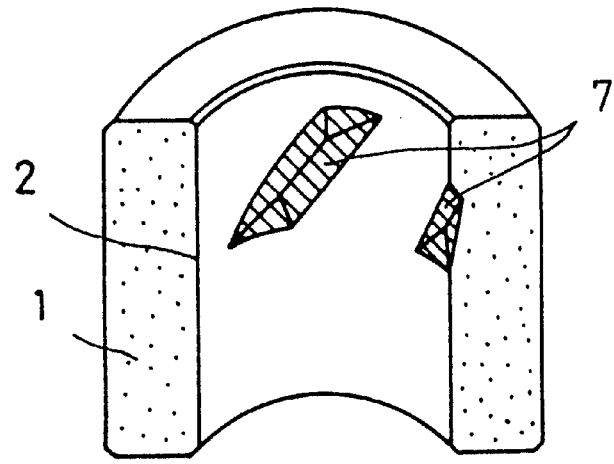

FIGS. 1a to 1c show the structure of a bearing unit of this embodiment.

Figure 2:
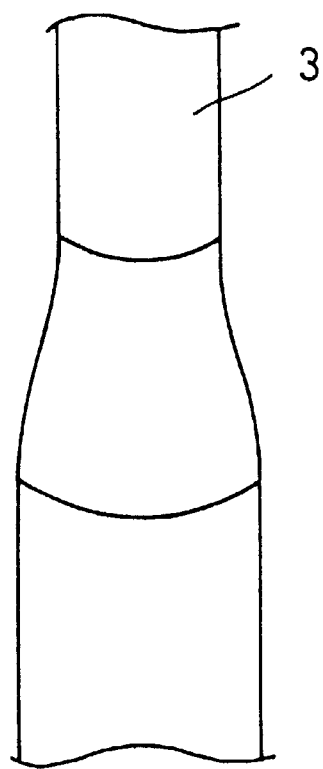
FIG. 2 is an illustration of an inner-surface pin of a mold for molding a green compact according to embodiment 1 of the present invention.

FIG. 1a shows a bearing 1 sintered after green-compact molding. In FIG. 1a, the bearing 1 is constituted by molding metallic powder such as of iron or copper into a green compact. The bearing has an inner surface 2 sliding together with the shaft of a motor, and this inner surface 2 is tapered upward so that its inside diameter gradually decreases toward the upper end thereof. Here, the shape of the inner surface 2 is formed by transferring to the body of the bearing 1 the outer-surface shape of an inner-surface pin 3 of a green-compact mold, said inner-surface pin 3 having a smaller outside diameter at the upper side than at the lower side and being tapered in the intermediate portion as shown in FIG. 2.

FIG. 1b shows the bearing 1 after concavities 4 are transferred to its inner-surface tapered portion. In FIG. 1b, a transfer pin 5 shown in FIG. 3 has been press-fitted into the bearing 1, whereby the concavities 4 have been transferred to the inner-surface tapered portion.

Figure 3:
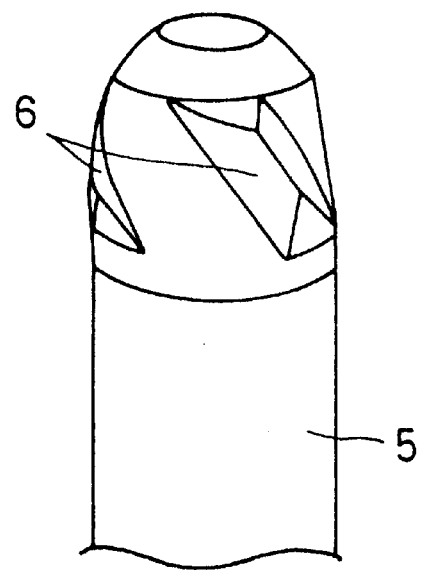
FIG. 3 is an illustration of a transfer pin according to embodiment of the present invention.

The shape of the transfer pin 5 for transferring the concavities 4 can be machined relatively easily. In this embodiment, the front end of the transfer pin 5 is tapered and formed with spiral protrusions 6 as shown in FIG. 3. In machining the transfer pin 5, though a high machining accuracy is required for the protrusions 6, the other portion not contacting the bearing 1 while transferring may be machined with any degree of accuracy and in any shape.

FIG. 1c shows the bearing 1 which has been sized. In FIG. 1c, the outer surface of the bearing 1 is sized straight, and the inner surface 2 of the bearing 1 is sized straight at the same time by press-fitting a straight pin thereinto, thereby plastically deforming the inner surface of the bearing 1. By this sizing, concavities 7 having a shape of a spiral groove which terminates near the upper end (hereafter referred to as a squeeze shape) is finally formed in the inner surface 2. In this case, the amount of sizing on the upper end side of the bearing inner surface 2 is larger than that on the lower end side, so that material density is higher and pores are smaller on the upper-end side of the inner surface 2.

The bearing 1 after sized is impregnated with a lubricant by means of vacuum impregnation and the lubricant is supplied between a shaft and the inner surface when the shaft rotates, thereby securing a preferable lubrication state.

The lubrication mechanism of the bearing unit is described below by referring to the accompanying drawings.

Figure 4A:
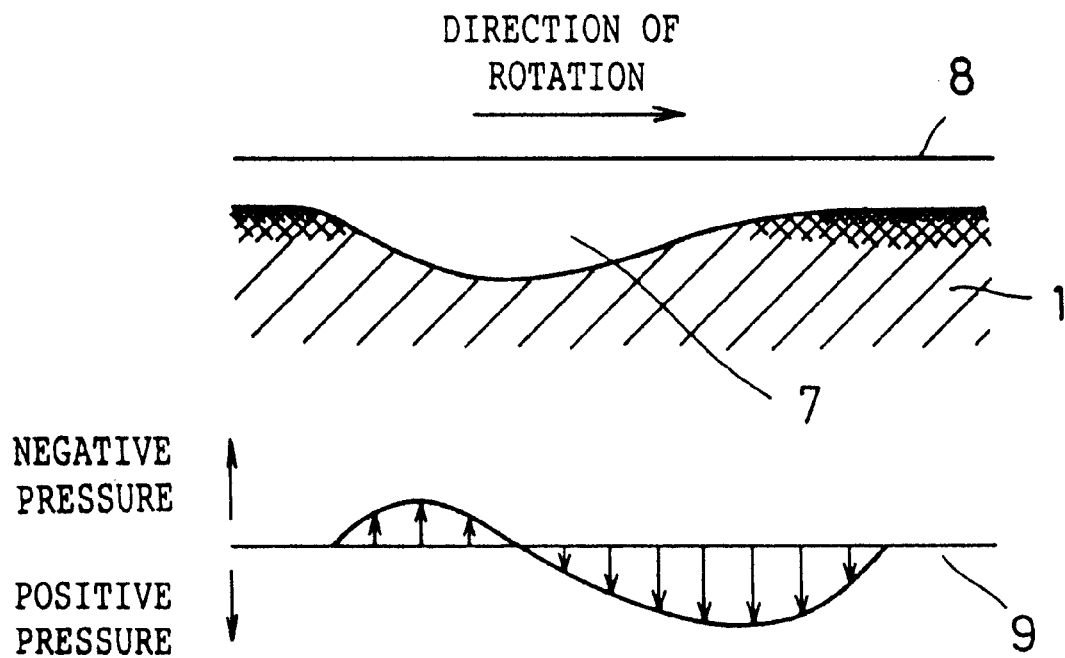
FIGS. 4a and 4b are illustrations showing a lubrication mechanism of the bearing unit according to embodiment 1 of the present invention.
Figure 4B:
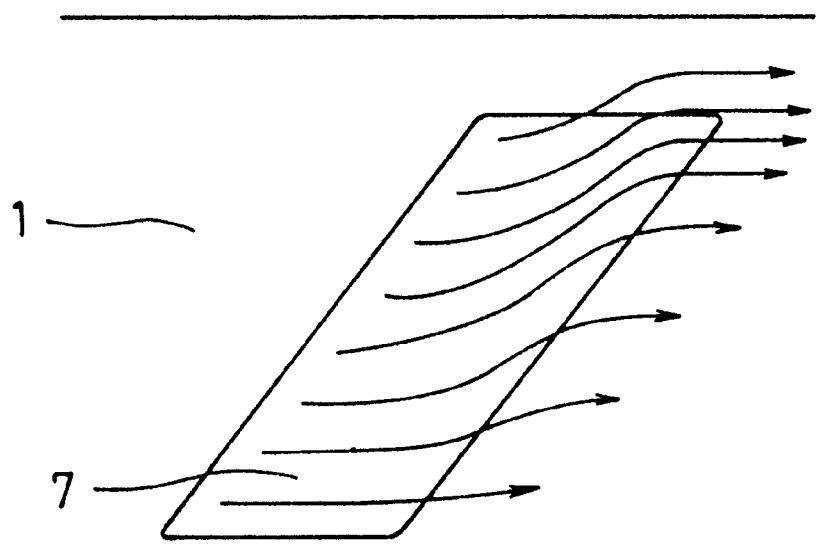

FIGS. 4a and 4b are illustrations schematically showing the lubrication mechanism of the bearing unit.

FIG. 4a shows an axial cross-section of the squeeze-shaped concavity 7. The concavity 7, as shown in FIG. 4a, is tapered so that the depth of the concavity gradually decreases toward the rotational direction. The sizing amount varies depending on each portion and the pores become smaller in a portion where the concavity is shallow. When a shaft 8 rotates, pressure 9 is produced as shown in FIG. 4a. In a portion of the concavity 7 before its deepest portion (a portion in the reverse rotational direction relative to the deepest portion), pressure is lower so that the lubricant oozes. Then, the oozed lubricant is slowly sent to a direction in which the concavity 7 becomes shallow in accordance with the rotation of the shaft 8 and the pressure 9 is produced due to the so-called wedge action.

FIG. 4b shows an extended elevation of the squeeze-shaped concavity 7 viewed from the inner-surface side.

A mechanism for producing a pressure due to the rotational directional flow of a lubricant is explained above. In the case of the bearing of this embodiment, an axial flow and a pressure due to this axial flow are produced. The lubricant flows in the rotational direction and at the same time, some of the lubricant flows in the upper end direction of the bearing 1 along the squeeze shape as shown in FIG. 4b. The flow of the lubricant is collected at a portion nearby the upper end of the squeeze shape and a pressure is produced at the same portion. To produce a high pressure, it is preferable that pores nearby the upper end of the squeeze shape are small. However, because of the sizing amount, the pores nearby the upper end of the bearing are small, so that it is possible to raise the pressure as well as to produce the pressure near the upper end of the bearing. As a result, the whirling control effect of the upper-end output shaft can be improved.

The bearing unit of this embodiment serves as a bearing unit having a high dynamic-pressure effect and a high rotational accuracy because of the synergism between the pressure due to the rotational-directional flow and the pressure produced nearby the upper end of the bearing.

The method of manufacturing the bearing 1 of the above embodiment requires one more additional step compared to embodiment 7 to be described later. However, the step to be added is a simple step of press-fitting only the transfer pin 5. Therefore, the conventional feature that an oil-impregnated sintered bearing can be produced at a low cost can be succeeded.

Figure 5A:
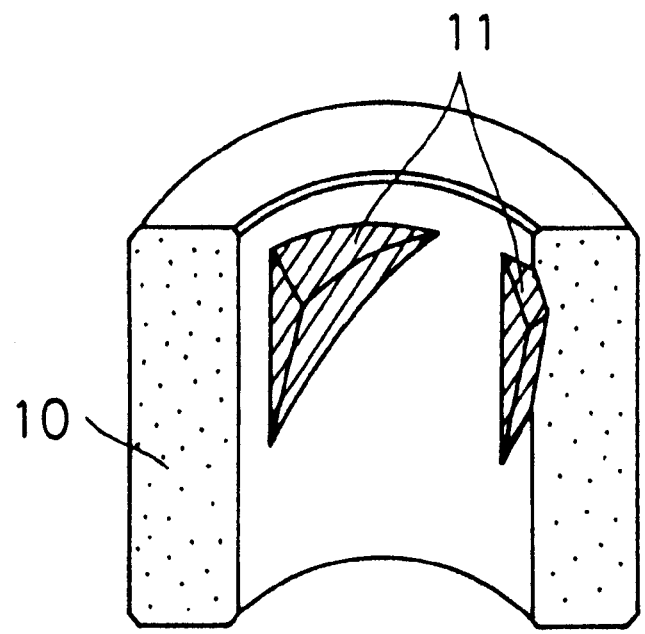
FIGS. 5a and 5b are semi-sectional perspective views showing another bearing unit according to embodiment 1 of the present invention.
Figure 5B:
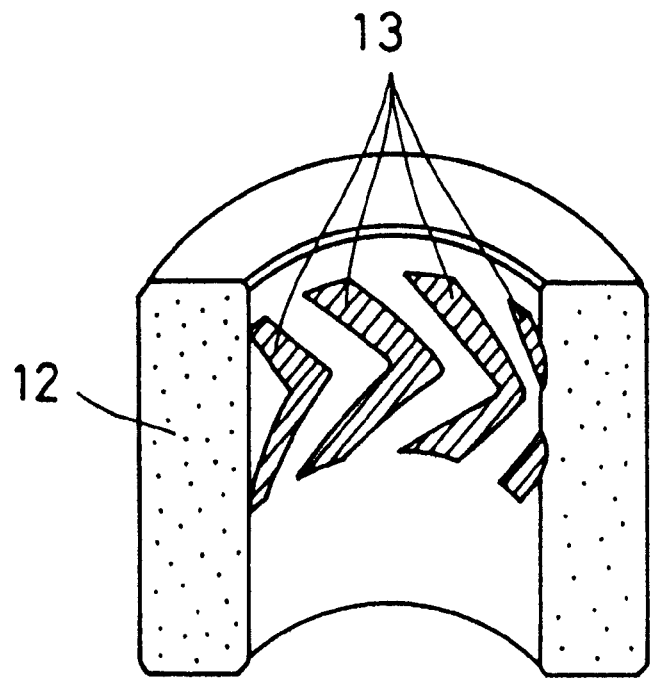

In the case of the above embodiment, the squeeze-shape concavity 7 is formed in the inner surface of the bearing 1. In addition, a triangular concavity 11 is formed, one side of which being along the upper end side of the bearing 10 as shown in FIG. 5a, or a herringbone-shape concavity 13 is formed in which a plurality of doglegged grooves are arranged in the rotational direction as shown in FIG. 5b. Moreover, a concavity of any shape can be formed at any depth distribution as long as the shape can be transferred to the inner surface. By selecting a shape proper to the purpose or working conditions, it is possible to obtain a bearing unit having an optimum characteristic.

The above embodiment shows a structure for transferring a concavity through one-time transferring. However, a concavity is transferred through several-time transferring step by step by using a plurality of transfer pins. Moreover, it is possible to transfer to more concavities than the number of protrusions formed on the transfer pins by machining the transfer pins and the bearing several times step by step while relatively rotating them.

(Embodiment 2)

Figure 6A:
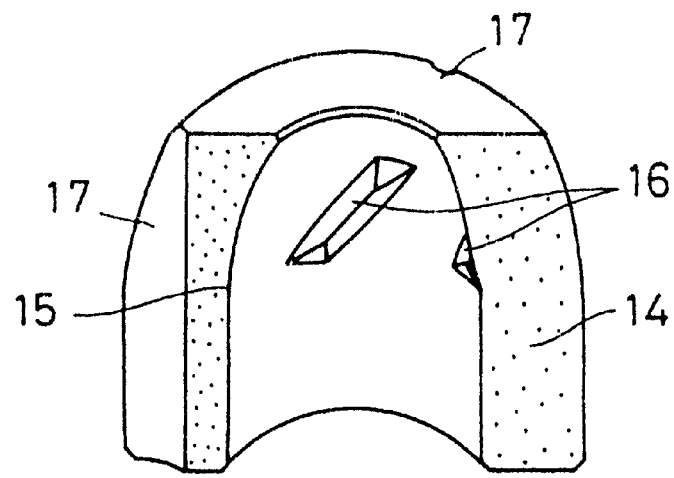
FIGS. 6a to 6c are sectional perspective views showing a bearing unit according to embodiment 2 of the present invention.
Figure 6B:
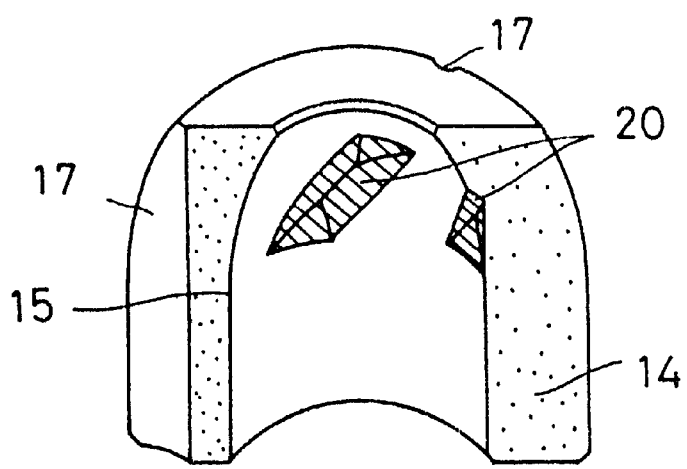

FIGS. 6a and 6b show the structure of the bearing unit of this embodiment.

FIG. 6a shows a bearing 14 sintered after green-compact molding. In FIG. 6a, the inner surface 15 of the bearing 14 is tapered so that the inside diameter is gradually decreased toward the upper end similarly to the case of embodiment 1. In this embodiment, however, the tapered portion is provided with a plurality of convexities 16 and moreover, a groove 17 for connecting the upper and lower sides is formed at several places on the outer surface.

Figure 7:
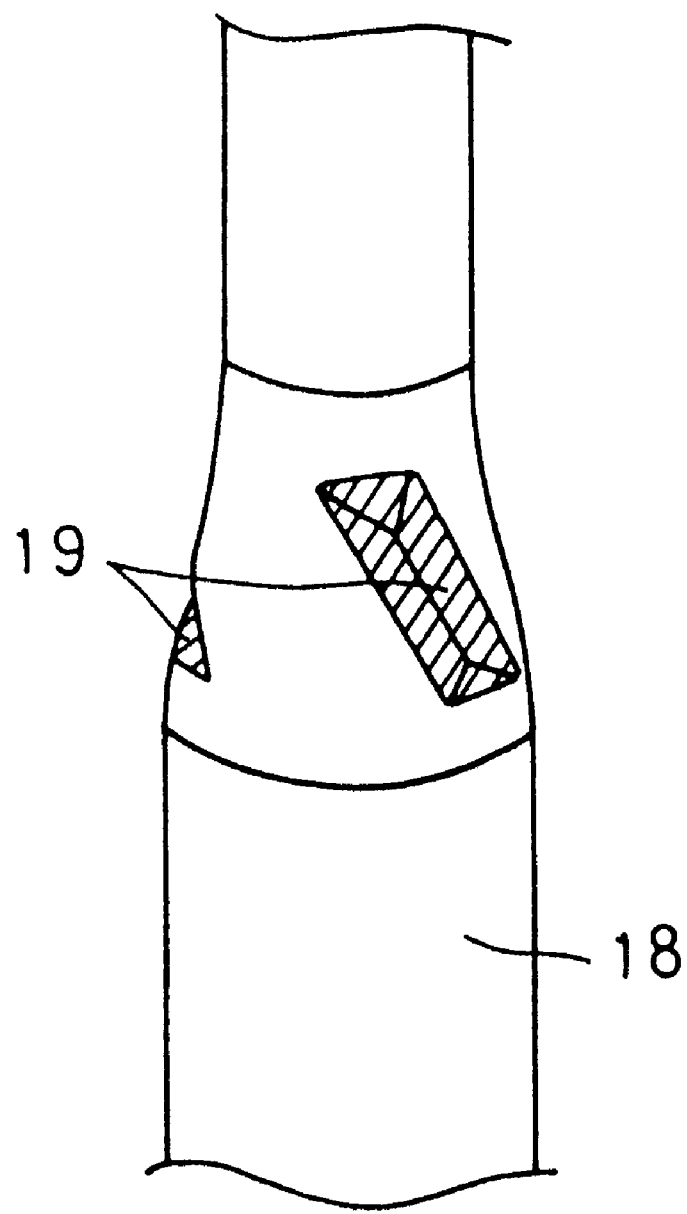
FIG. 7 is an illustration of an inner-surface pin of a mold for molding a green compact according to embodiment 2 of the present invention.

In this case, the inner-surface pin 18 of the mold for molding a green compact for forming the bearing 14 is so formed that the upper outside diameter is smaller than the lower outside diameter, the intermediate portion is tapered and a plurality of concavities 19 are formed in said tapered portion as shown in FIG. 7. The shape of the inner surface 15 is formed by transferring this shape of the inner-surface pin 18 to the body of the bearing 14.

FIG. 6b shows the bearing 14 in which a concavity 20 is transferred to the inner-surface tapered portion. In FIG. 6b, a transfer pin 5 shown in FIG. 3 is press-fitted into the bearing 14 so as to transfer the concavity 20 to the inner-surface tapered portion. In this case, the bearing 14 is positioned on the basis of grooves 17 formed on the outer surface during green-compact molding and then machined, so that the concavities 20 are transferred synchronously with the convexities 16 formed during the green-compact molding. In this embodiment where the concavities 20 are transferred synchronously with the convexities 16 formed during the green-compact molding, the pore distribution in the concavities 20 can also be controlled.

Figure 6C:
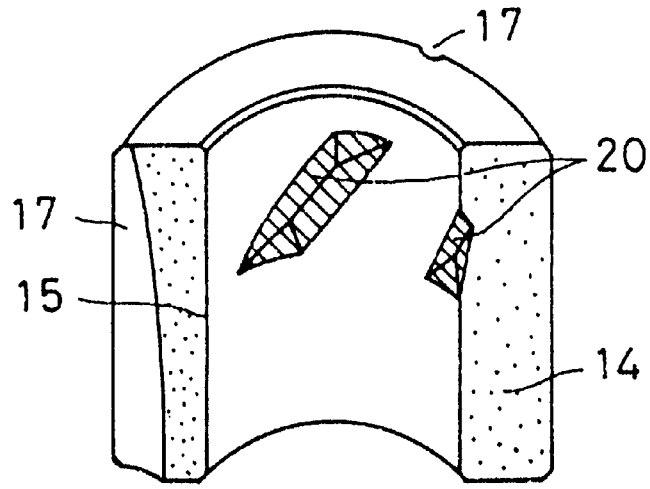

FIG. 6c shows the bearing 14 which has been sized. In FIG. 6c, the outer surface of the bearing 14 is sized straight, and at the same time the inner surface 15 is sized straight by press-fitting a straight pin, thereby plastically deforming the inner surface. By this machining, the so-called squeeze-shape concavity 20 in which a spiral groove terminates nearby the upper end is finally formed in the inner surface 15. In this case, the upper end of the inner surface 15 has a high material density and a very small number of pores because the sizing amount at the upper end of the surface 15 is large compared to the lower end of the surface 15.

Figure 8A:
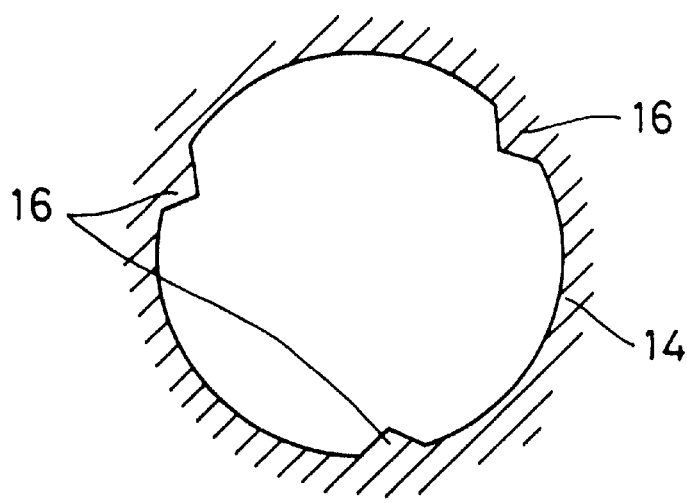
FIGS. 8a to 8c are illustrations showing the process of inner-surface porosity control according to embodiment 2 of the present invention.
Figure 8B:
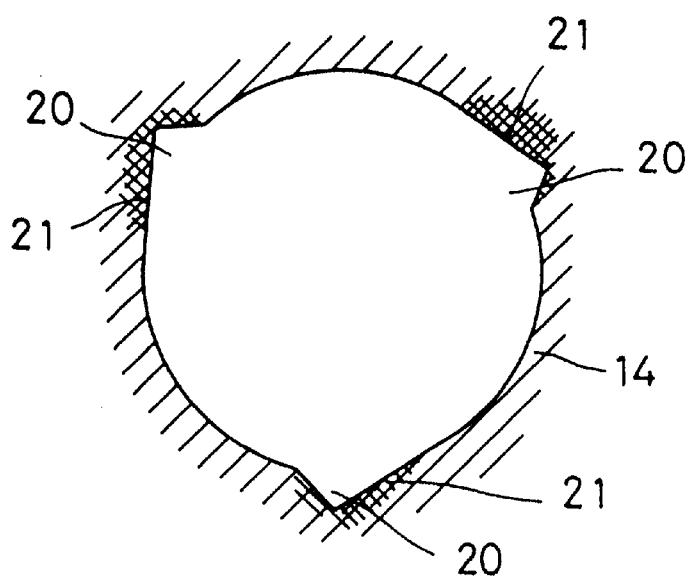
Figure 8C:
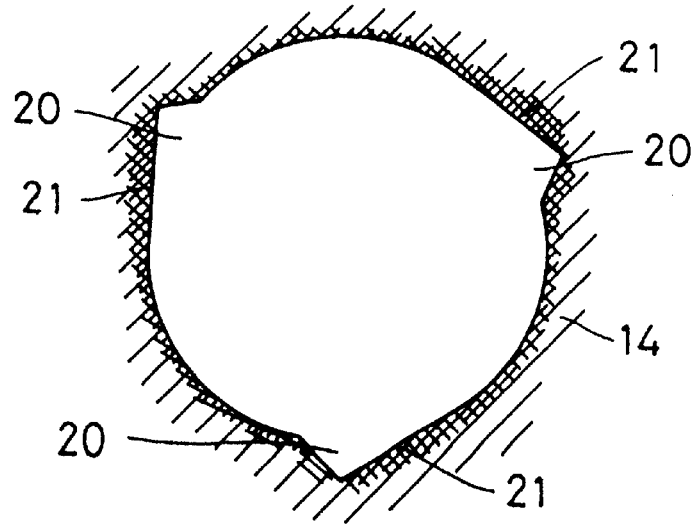

FIGS. 8a to 8c are illustrations showing the steps of controlling pores.

FIG. 8a is an illustration schematically showing an axis-directional cross section of the bearing 14 sintered after green-compact molding. In FIG. 8a, convexities 16 are formed in the bearing inner surface. At this point of time, the density of the bearing 14 is almost constant everywhere.

FIG. 8b is an illustration schematically showing an axis-directional cross-section of the bearing 14 to which concavities 20 are transferred. In FIG. 8b, the concavity 20 transferred to the bearing inner surface has a high density at the side of a slope 21 and small pores under the effect of the convexity 16 provided during the green-compact molding.

FIG. 8c is an illustration schematically showing an axis-directional cross-section of the sized bearing 14. In FIG. 8c, the vicinity of the sliding surface of the bearing 14 has a high density and small pores both due to the sizing of the inner surface. By this sizing, pores nearby the deepest portion of the concavity 20 where the pressure becomes lower than the surroundings are finally left as they are, and pores at the side of a concavity slope 21 where the pressure rises become small.

According to the above structure, lubricant easily oozes at a portion where the concavity 20 is deep and pores are large, while lubricant does not easily permeate at the slope 21 side where pressure is high and pores are small. Therefore, the bearing unit of this embodiment makes it possible to ideally realize the wedge action that causes pressure to rise easily and to meet a condition for efficiently generating the highest pressure.

Moreover, the groove 17 formed on the outer surface of the bearing 14 of this embodiment is slowly decreased in depth and width toward the upper end of the bearing 14. When the bearing 14 is set into a motor, lubricant in the bearing 14 is easily concentrated to the lower side under gravity. However, the lubricant nearby the lower end of the groove 17 is drawn up from the lower end of the groove 17 to the upper end of the groove 17 by the so-called capillary force. Thus supplying the lubricant to the upper end of the bearing 14 where lubricant easily runs short, the bearing 14 enhances its reliability. In addition, when the bearing 14 is set into a motor, if a difference is produced between upper- and lower-end air pressures of the bearing 14 due to a temperature rise or the like, the groove 17 effects such functions as to release air, to prevent the so-called oil-surface rise which causes the oil in the bearing 14 to leak outside, and to cool the bearing 14 and lubricant by increasing the surface area of the bearing 14.

According to the above structure, the bearing 14 of this embodiment provides a bearing unit having a higher dynamic-pressure effect and higher rotational accuracy and being superior in reliability.

Figure 9A:
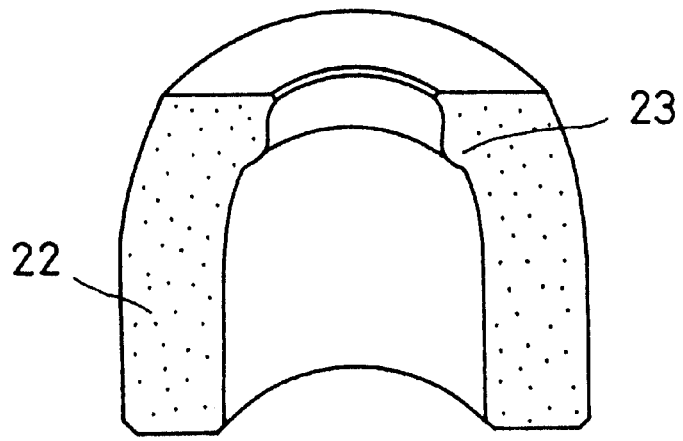
FIGS. 9a to 9c are semi-sectional perspective views showing another bearing unit according to embodiment 2 of the present invention.
Figure 9B:
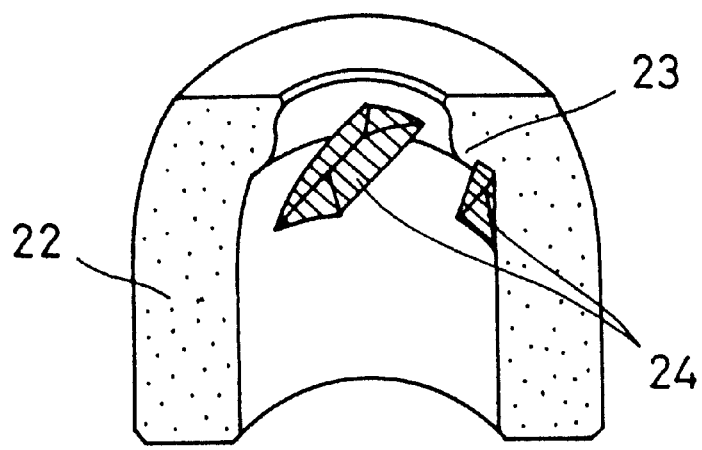
Figure 9C:
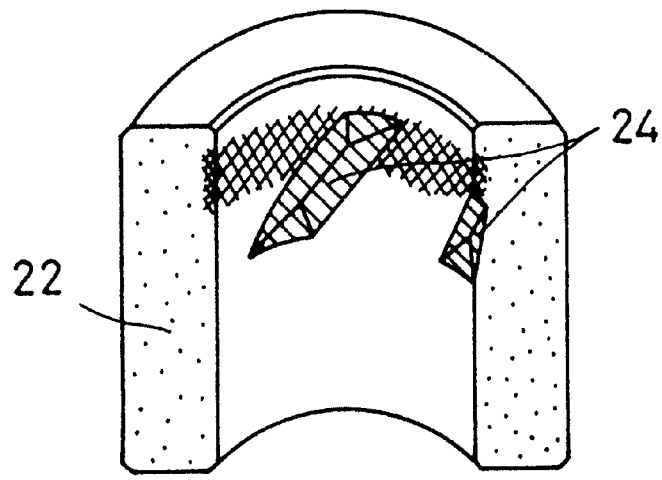

Moreover, in the case of the above embodiment, the convexity 16 formed during the green-compact molding has a shape similar to the concavity 20 to be transferred in the subsequent process. Moreover, as shown in FIGS. 9a to 9c, when the entire circumference in the vicinity of the upper end of the concavity to be transferred in the subsequent process is formed to be convexity during the green-compact molding, it is effective to decrease pores nearby the upper end of the concavity where pressure is produced. Therefore, it is possible to similarly control the distribution of pores.

Figure 10A:
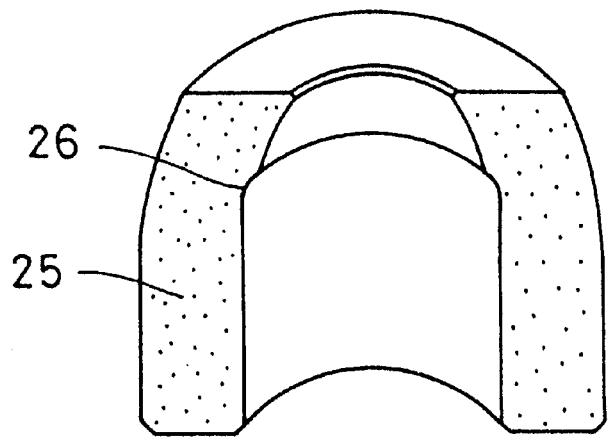
FIGS. 10a to 10c are semi-sectional perspective views showing still another bearing unit according to embodiment 2 of the present invention.
Figure 10B:
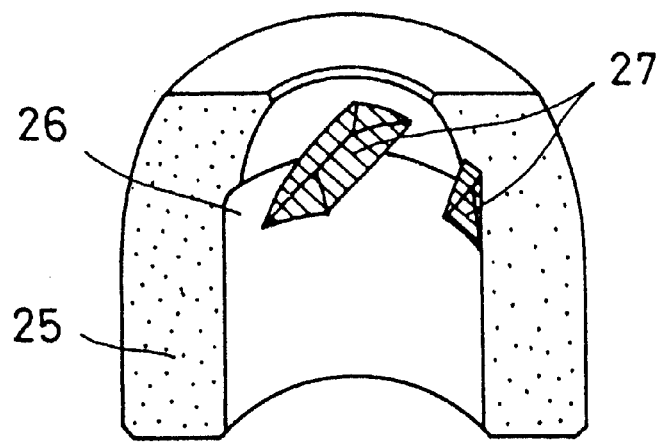
Figure 10C:
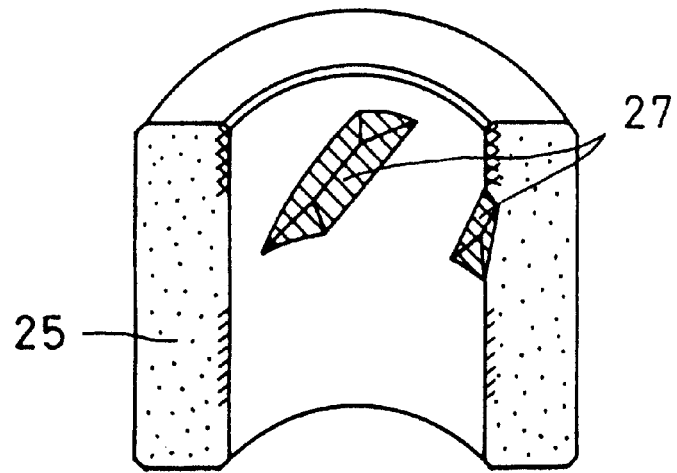

Otherwise, as shown in FIGS. 10a to 10c, when the entire circumference in the vicinity of the lower end of the concavity to be transferred in the subsequent process is formed to be concavity during the green-compact molding, it is effective to increase the size of pores nearby the lower end of the concavity from which lubricant oozes. Therefore, it is possible to similarly control the distribution of pores.

In the case of the above embodiment, a groove is formed on the bearing outer surface to penetrate the upper and lower ends thereof. When a groove of which either end is closed is formed, the air-release effect described above cannot be expected, but the groove can be used for positioning at the time of transferring a concavity, thereby allowing the similar machining to be made.

(Embodiment 3)

Embodiment 2 shows an single bearing. However, by combining a plurality of the bearings of embodiment 2, it is possible to provide a bearing unit having higher rotational accuracy.

Figure 11:
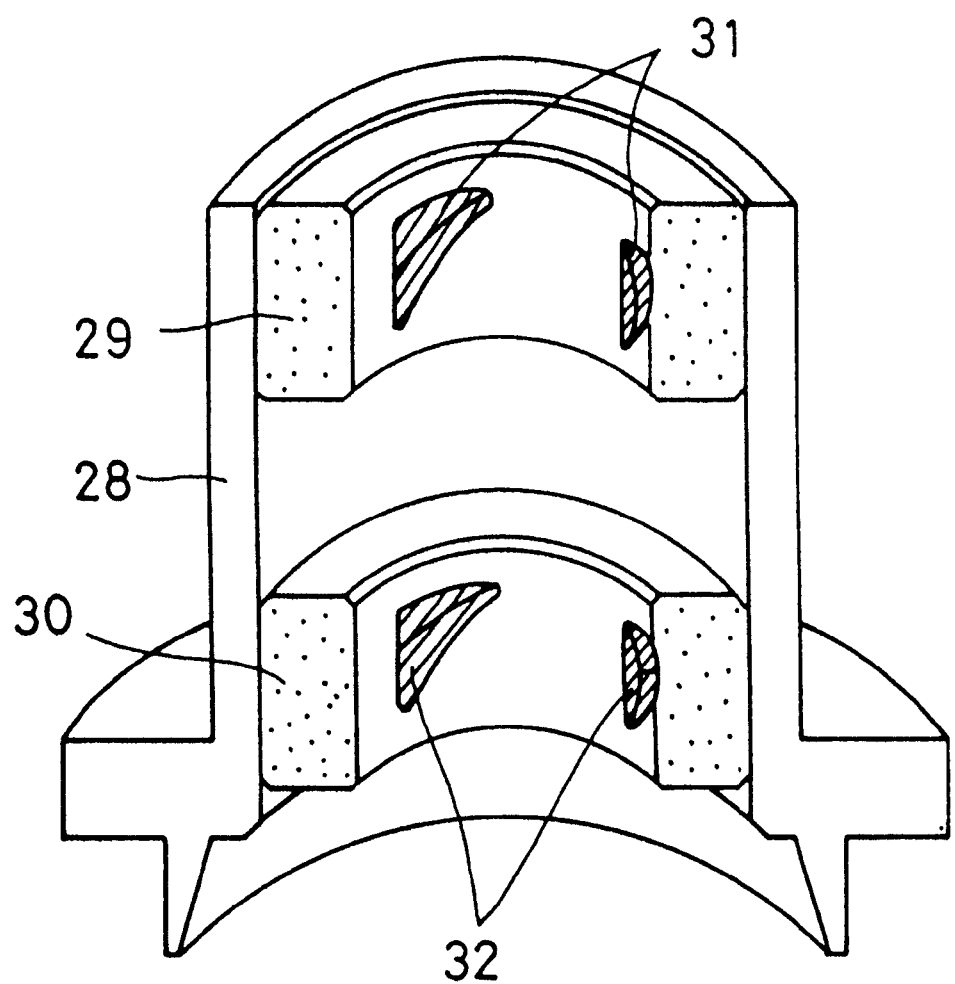
FIG. 11 is a sectional perspective view showing a bearing unit according to embodiment 3 of the present invention.

FIG. 11 shows the bearing unit of this embodiment. The bearing unit of this embodiment is constituted by press-fitting and securing two bearings 29 and 30 to a bearing housing 28. The bearings 29 and 30 are set by turning the small-pore side upward. In this case, inner-surface concavities 31 and 32 are arranged in a direction suitable to produce a dynamic pressure when a shaft rotates in one direction. According to the above structure, it is possible to effectively control the whirling of a shaft compared to the case of using only one bearing by producing a pressure by two of the upper and lower bearings 29 and 30.

(Embodiment 4)

Figure 12:
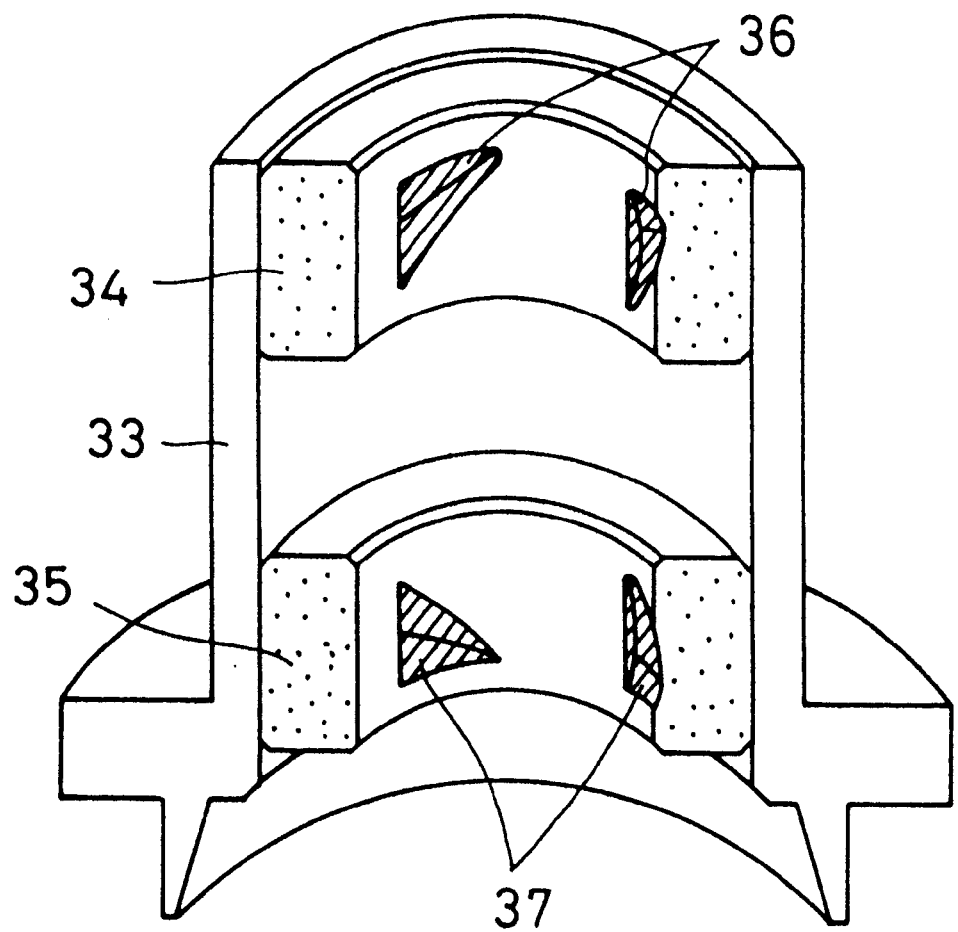
FIG. 12 is a sectional perspective view showing a bearing unit according to embodiment 4 of the present invention.

FIG. 12 shows the bearing unit of this embodiment. The bearing unit of this embodiment is the same as that of embodiment 3 in that a pair of bearings 34 and 35 are press-fitted and secured to a bearing housing 33. However, the bearings 34 and 35 are set with their small-pore sides at the upper and the lower end respectively so that the shapes of concavities 36 and 37 formed in the inner surface face a direction suitable to produce a dynamic pressure when a shaft rotates in one direction. Specifically, the shapes of the upper and lower bearings 34 and 35 are formed symmetrically on the upper and lower sides.

According to the above structure, two transfer pins are necessary to transfer the concavities 36 and 37 because the shapes of the portions 36 and 37 are different from each other. However, by producing a pressure nearby the ends of the upper and lower bearings 34 and 35, it is possible to more effectively control the whirling of a shaft.

(Embodiment 5)

In embodiments 3 and 4, a case is shown in which a plurality of the bearings of embodiment 1 are combined. However, a method for further improving the rotational accuracy of a single bearing is described below.

Figure 13A:
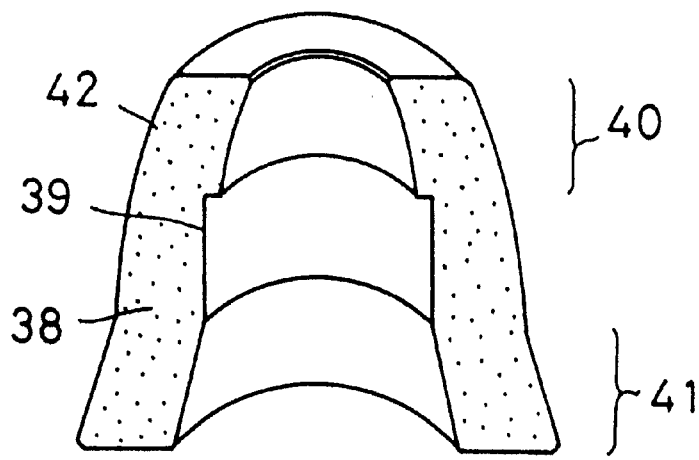
FIGS. 13a to 13c are sectional perspective views showing a bearing unit according to embodiment 5 of the present invention.
Figure 13B:
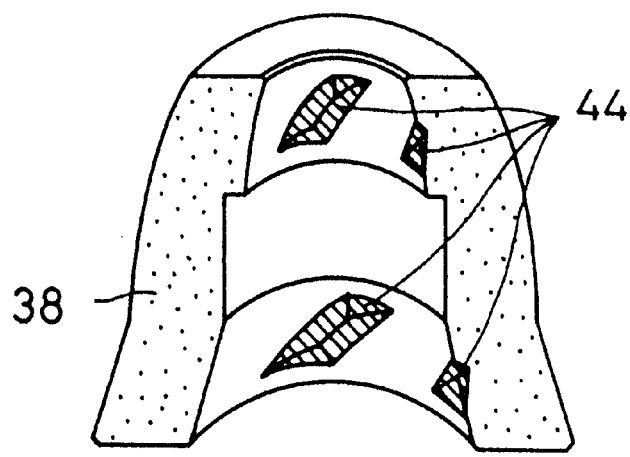
Figure 13C:
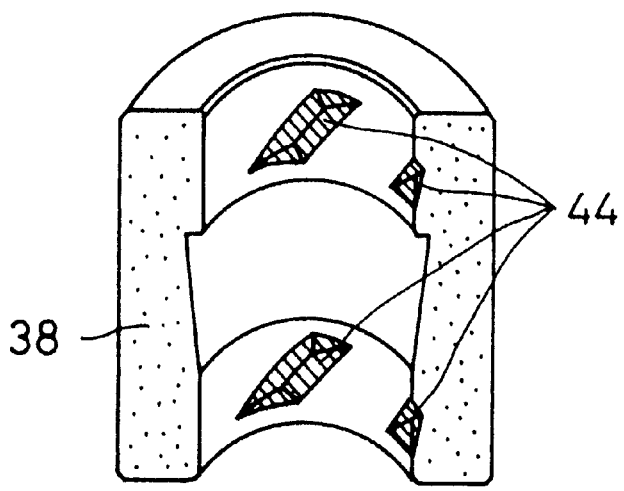

FIGS. 13a to 13c show a structure of the bearing unit of this embodiment.

FIG. 13a shows a bearing 38 sintered after green-compact molding. In FIG. 13a, an inner surface 39 having a sliding portion with a motor shaft and a middle run-off are formed on the bearing 38, and a portion with smaller diameter is provided for an upper end 40 of the inner surface 39 and the upper end 40 and a lower end 41 are tapered. Moreover, an outer surface 42 is tapered so that the lower end 41 becomes large.

Figure 14:
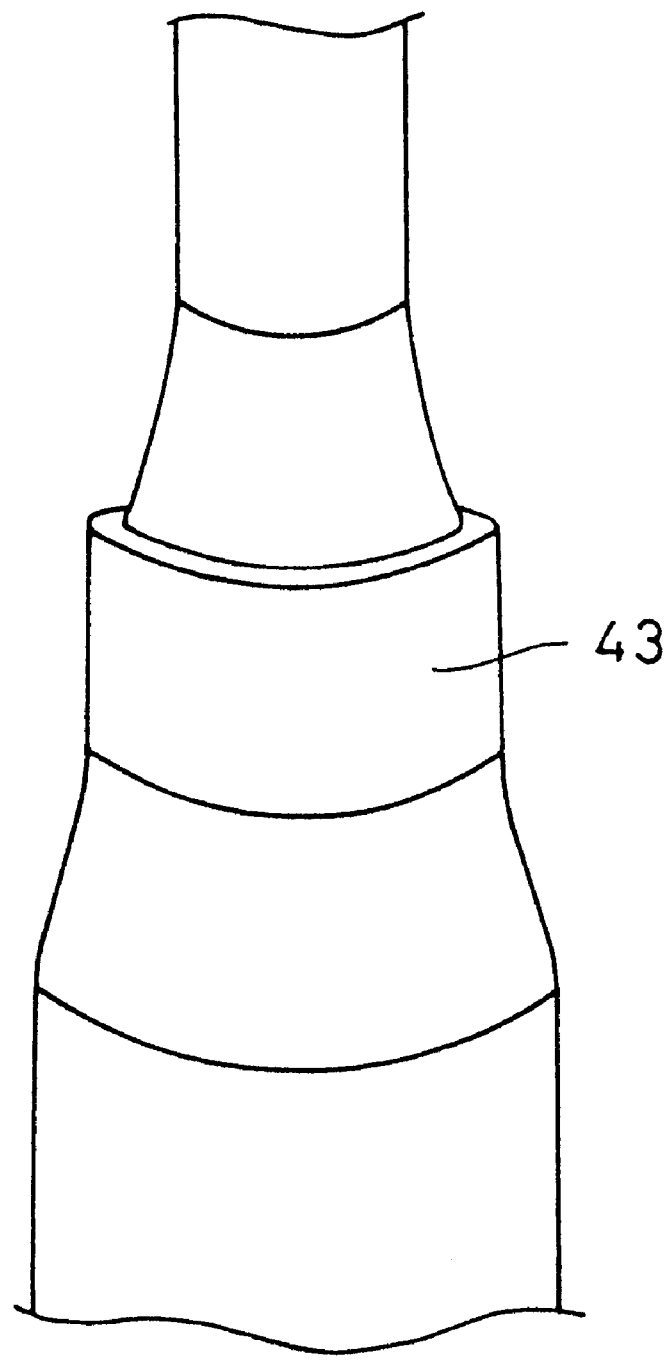
FIG. 14 is an illustration of an inner-surface pin of a mold for molding a green compact according to embodiment 5 of the present invention.

In this case, as shown in FIG. 14, the outer surface of an inner-surface pin 43 of the mold for molding a green compact for forming the bearing 38 is formed into three stages by forming a level difference between the first stage and the second stage, tapering the outer surface thereof and tapering a portion between the second stage and the third stage. The shape of the inner surface 39 is formed by transferring this shape of the inner-surface pin 18 to the body of the bearing 14.

Figure 15:
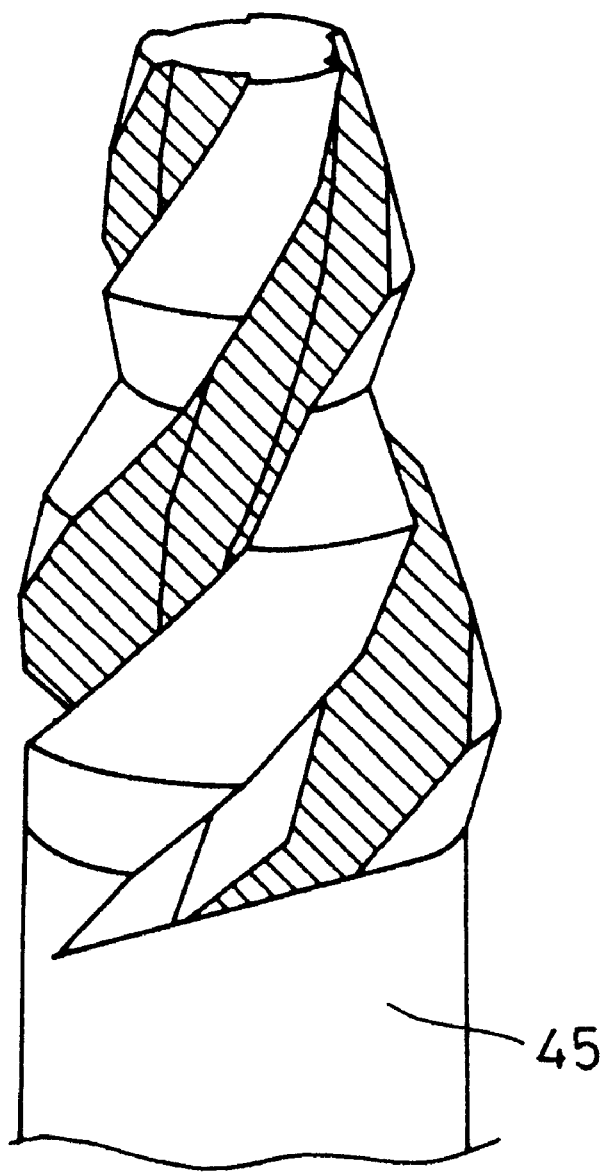
FIG. 15 is an illustration of a transfer pin according to embodiment 5 of the present invention.

FIG. 13b shows the bearing 38 in which a plurality of concavities 44 are transferred to the inner surface 39. In FIG. 13b, a transfer pin 45 shown in FIG. 15 is press-fitted to the bearing 38, thereby transferring the concavities 44 to the inner surface. The transfer pin 45 is formed by forming spiral grooves on the outer surface of a pin and forming said outer surface into a stepped tapered shape toward the front end.

Figure 16:
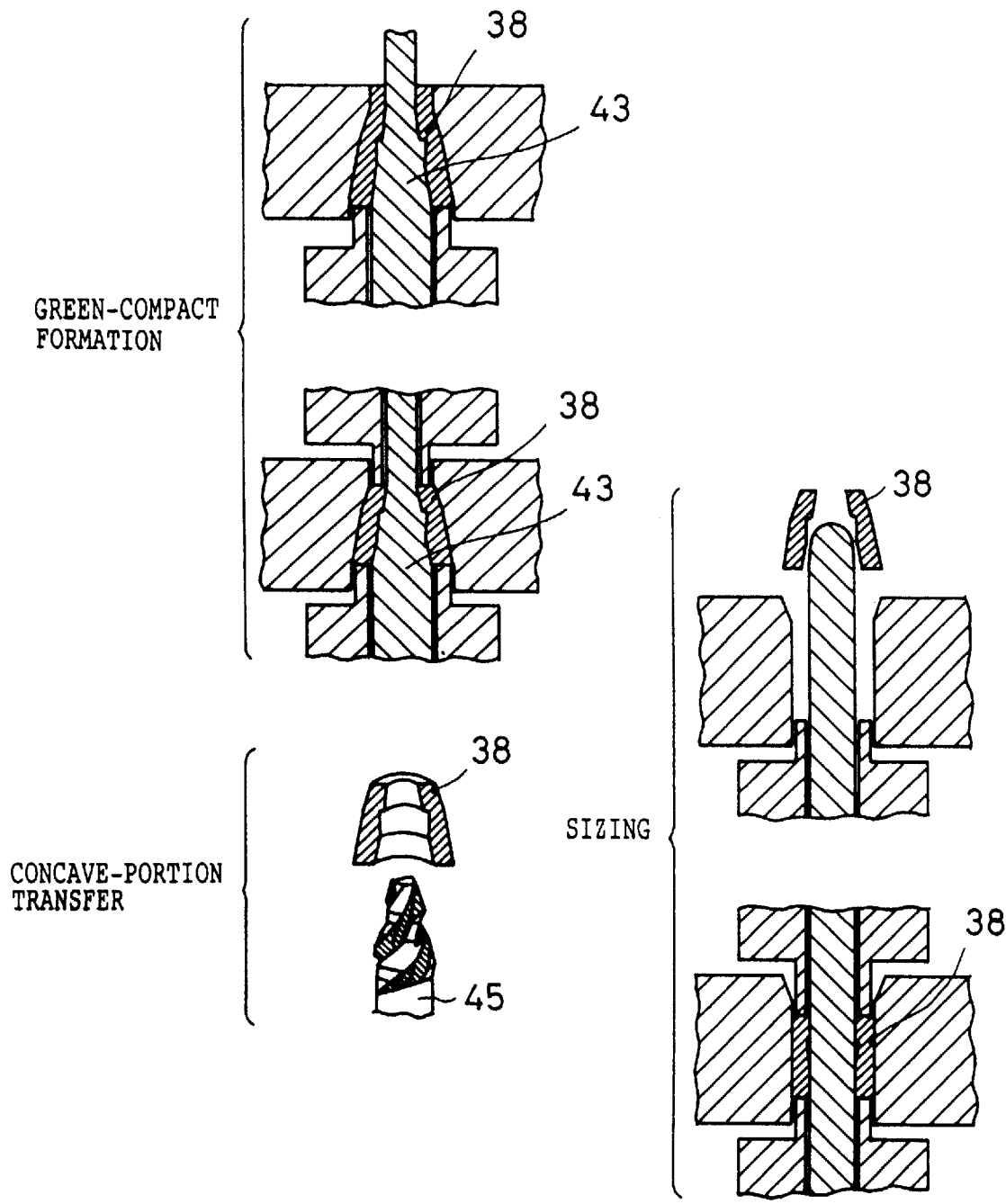
FIG. 16 is an illustration showing the steps of manufacturing the bearing unit according to embodiment 5 of the present invention.

FIG. 13c shows the bearing 38 after sizing. In FIG. 13c, the inner surface 39 of the bearing 38 is sized straight by sizing the outer-surface shape formed at the time of green-compact molding so that the inside diameter of the lower end 41 decreases by one stage. Moreover, the inner surface 39 is sized straight by press-fitting a straight pin so as to plastically deform the inner surface as shown by the process in FIG. 16. In this process, upper and lower sliding portions and the concavity 44 provided for each sliding portion are integrally formed by the single bearing 38.

The concavities 44 of the upper and lower sliding portions respectively show the dynamic pressure effect same as the effects by embodiments 1 and 2 when setting the portions 44 into a motor. Thus, it is possible to constitute a bearing unit capable of effectively controlling the whirling of a shaft.

Moreover, because upper and lower sliding surfaces are integrally formed by the single bearing 38 and the axes of the upper and lower sliding surfaces coincide with each other in this embodiment, no shaft is twisted and thus, a stable performance can be obtained compared to the case where two or more bearings are combined.

Furthermore, the middle run-off provided for the inner surface 39 of this embodiment serves as an oil keeping mechanism and has functions for supplying lubricant to a sliding surface and preventing the lubricant from leaking to a bearing end. Therefore, the middle run-off is means effective to improve the reliability.

In the above embodiment, the upper and lower sliding surfaces are formed by providing a middle running run-off for the inner surface 39. However, by tapering the whole of the portion 39 at the time of green-compact molding without providing any middle run-off for the portion 39 and transferring a concavity to upper and lower sides respectively in the subsequent process, it is possible to constitute a bearing unit capable of effectively controlling the whirling of a shaft by producing a dynamic pressure at the upper and lower stages though the effect of the middle run-off cannot be expected.

Though the above embodiment uses the structure of upper and lower stages, it is also possible to form a structure of three stages or more by the same method.

(Embodiment 6)

In embodiment 5, almost the same machining is applied to the upper and lower ends of the bearing. However, this embodiment shows a case capable of providing a bearing unit having a more preferable characteristic by intentionally changing upper and lower states of a bearing.

Figure 17:
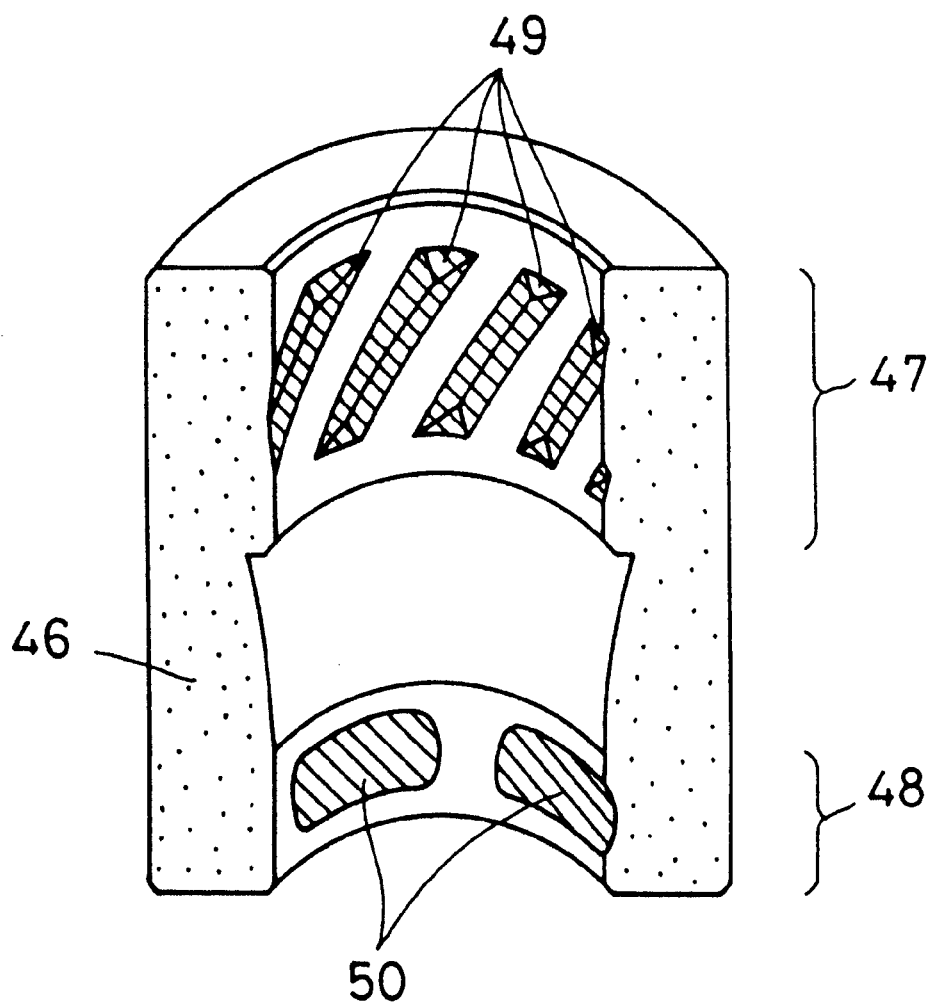
FIG. 17 is a sectional perspective view showing a bearing unit according to embodiment 6 of the present invention.

FIG. 17 shows the bearing 46 of this embodiment. In the case of the bearing of this embodiment, the length of the sliding surface of the upper end 47 of the bearing is made different from the length of the sliding surface of the lower end 48 of the bearing and moreover, the shape of and the number of concavities provided for the upper sliding surface are made different from those provided for the lower sliding surface.

In the case of a bearing unit used for a motor, it is normal that an unbalanced load is heavily applied to the output side to which a load is connected but no large load is applied to the anti-output side. In this embodiment, the load capacity of a sliding surface at the high load side is increased by making the sliding area of the upper end 47 serving as the output side larger than that of the sliding area of the lower end 48 serving as the anti-output side so as to improve the reliability. Moreover, concavities 49 in the upper end 47 are formed into a shape stressing the dynamic pressure effect and concavities 50 in the lower end 48 are formed into a shape stressing the decrease of shaft loss torque, and moreover, the number of the upper concavities 49 is made different from the number of the lower concavities 50. Thereby, whirling of a shaft is prevented at the upper end 47 and the shaft is supported at a necessary minimum shaft loss at the lower end 48. Thus, it is possible to provide a bearing unit realizing both rotational accuracy and low shaft loss toque of a shaft at a high level.

(Embodiment 7)

In the above embodiments, every concavity in the inner surface of a bearing is formed by transferring the protrusion shape of a pin having a protrusion by press-fitting the pin into a bearing after green-compact molding. In this embodiment, however, a plurality of concavities are simultaneously provided for the inner surface of a bearing at the time of green-compact molding by using an inner-surface pin of a mold having a protrusion.

Figure 18A:
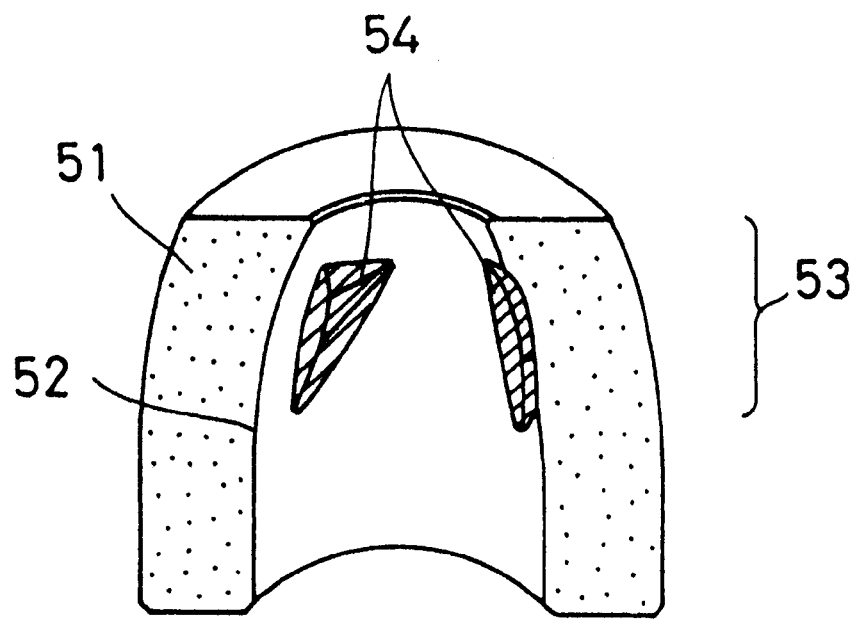
FIGS. 18a and 18b are sectional perspective views showing a bearing unit according to embodiment 7 of the present invention.

FIG. 18a shows a bearing 51 sintered after green-compact molding.

Figure 19:
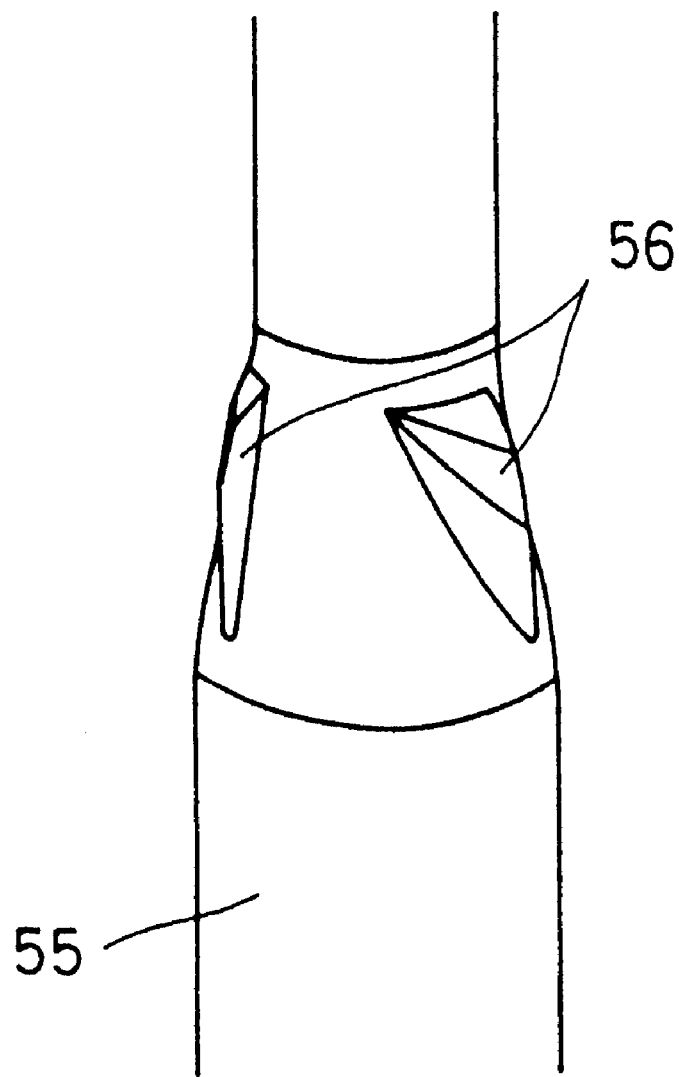
FIG. 19 is an illustration of an inner-surface pin of a mold for molding a green compact according to embodiment 7 of the present invention.

In FIG. 18a, the bearing 51 is constituted by molding a metallic powder of iron or copper into a green compact by a mold. An inner surface 52 sliding together with the shaft of a motor is formed on the bearing 51. Moreover, the inner surface 52 is tapered so that the inside diameter gradually decreases toward the upper end and concavities 54 are formed in a tapered portion 53. In this case, the shape of the inner surface is formed, as shown in FIG. 19, by making the upper outside diameter of the inner-surface pin 55 of a mold for green-compact molding the bearing 51 smaller than the lower outside diameter of the pin 55, and tapering the intermediate portion and providing a protrusion 56 for the intermediate portion, thereby transferring the shape of the protrusion to the body of the bearing 51. This embodiment shows a case in which the protrusion 56 is triangular and its sectional form is also triangular.

In this case, if the height of the protrusion 56 is made larger than the lower outside diameter, the releasability of the mold is deteriorated. Therefore, it is preferable to make the height of the protrusion 56 equal to or smaller than the lower outside diameter as shown in FIG. 19.

Figure 18B:
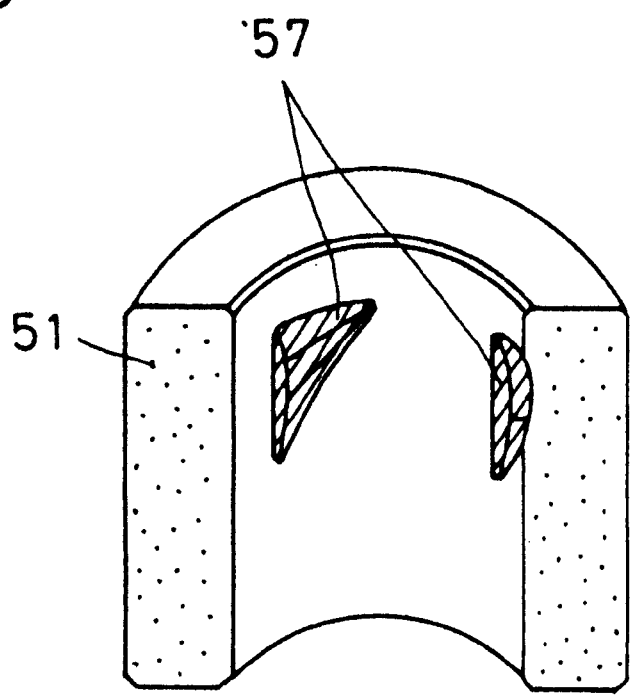

FIG. 18b shows the bearing 51 after sized.

In FIG. 18b, the outer surface of the bearing 51 is sized straight and its inner surface 52 is sized straight by press-fitting a straight pin so as to plastically deform the inner surface. In this case, the upper end of the bearing inner surface 52 has a high material density and a very few pores because the sizing amount increases compared to the lower end of the portion 52. Moreover, the concavity 54 in the inner surface 52 formed at the time of green-compact molding remains as a triangular concavity 57 viewed from the inner surface side and the number of pores in the inner surface around the concavity 57 decreases toward the bearing upper end as described above.

The sized bearing 51 is impregnated with lubricant by means of vacuum impregnation. Because the lubricant is supplied between a shaft and the inner surface when the shaft rotates, a preferable lubrication state is secured.

Description of the lubrication mechanism of this bearing unit is omitted because the mechanism is almost the same as the lubrication mechanism described in embodiment 1 referring to FIG. 4a, though the shape of a concavity and the state of pores at the concavity are slightly different from those of the mechanism of embodiment 1.

The method for manufacturing the bearing 51 of the above embodiment is the same as the conventional method for manufacturing an oil-impregnated sintered bearing of which inner-surface shape is completely circular except that the shape of the inner-surface pin 55 of the mold for green-compact molding is specific, and thus, the conventional feature that the production cost of an oil-impregnated sintered bearing is low is succeeded.

Figure 20A:
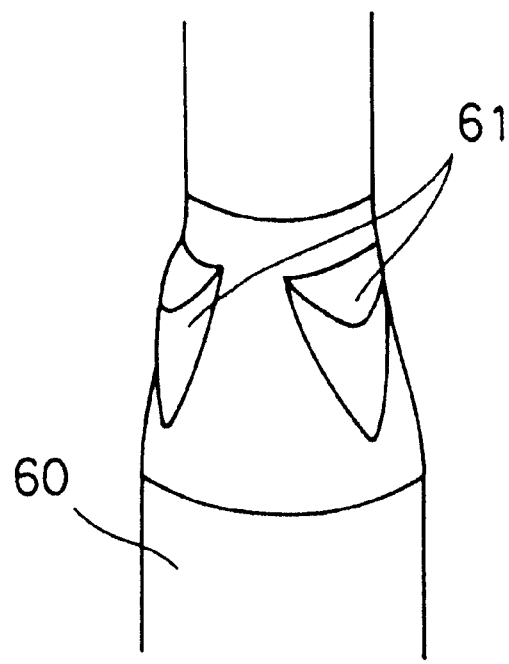
FIGS. 20a and 20b are perspective views of another inner-surface pin of a mold for molding a green compact according to embodiment 7 of the present invention.
Figure 20B:
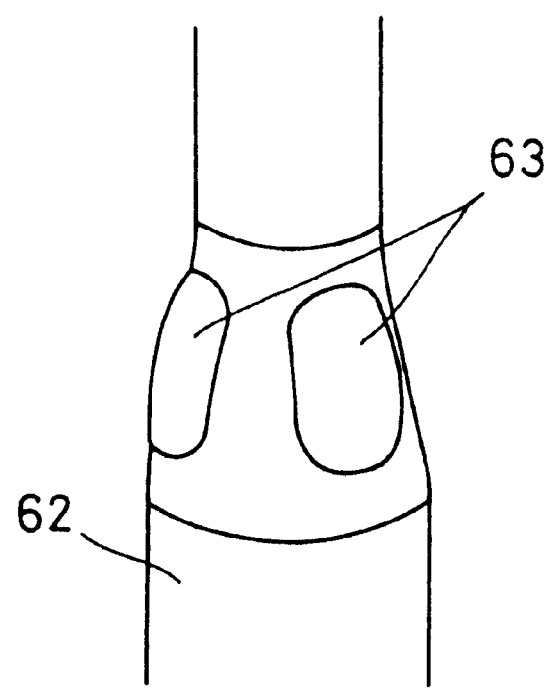

Moreover, in the above embodiment, the inner-surface pin is so constituted that its tapered portion is provided with the triangular protrusion 56 of which cross-section is triangular as shown in FIG. 19. As shown in FIG. 20a, however, the tapered portion of the inner-surface pin 60 may be provided with a protrusion formed in a shape consisting three or more circular-arc surfaces having a curvature smaller than that of a circular-arc surface about an axis core are combined. Or, as shown in FIG. 20b, by forming a gentle elliptic protrusion on the tapered portion of an inner-surface pin 62, almost the same machining can also be possible.

Figure 21A:
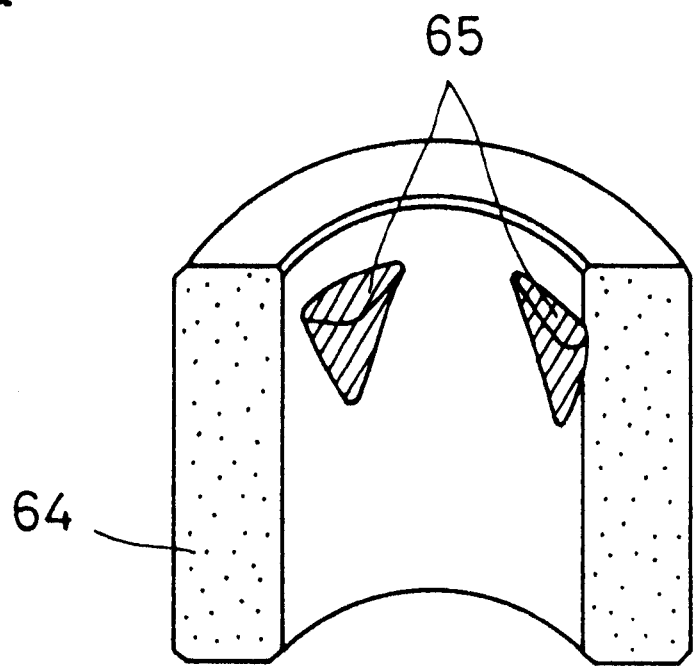
FIGS. 21a and 21b are semi-sectional perspective views showing another bearing unit according to embodiment 7 of the present invention.
Figure 21B:
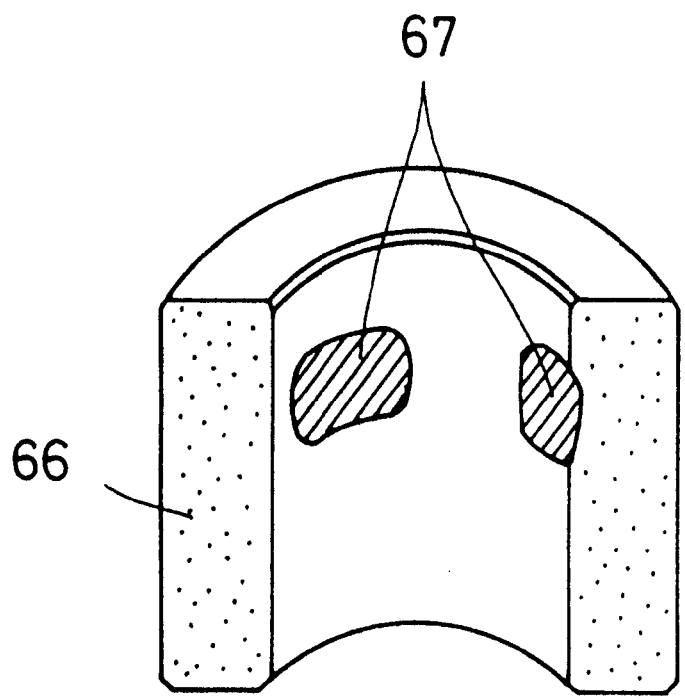

In the above embodiment, the concavity 57 of the inner surface 52 is formed into an asymmetric triangle. However, as shown in FIG. 21a, the concavity 57 is formed into a right-and-left symmetric triangle by using the inner-surface pin 60 of FIG. 20a. When the concavity 57 is formed into a right-and-left symmetric shape such as a right-and-left symmetric ellipse as shown in FIG. 21b by using the inner-surface pin 62 of FIG. 20b, a constant dynamic-pressure effect is obtained independently of the rotational direction of a shaft though the dynamic-pressure effect is slightly deteriorated. Therefore, by using the concavity 57 for a bearing unit requiring both clockwise and counterclockwise rotations, it is possible to provide a bearing unit having a rotational accuracy higher than that of a conventional one.

A single bearing is shown in the above embodiment 7 according to which a plurality of concavities are simultaneously formed at the time of green-compact molding. This embodiment also makes it possible to provide a bearing unit constituted by combining a plurality of bearings (FIGS. 11 and 12) similarly to the cases of embodiments 3 and 4. Moreover, it is possible as a matter of course to provide a bearing unit capable of showing a plurality of bearing functions by a single bearing in accordance with embodiment 5 (FIG. 13c).

In embodiments 1 to 7, the number of concavities is not described in detail. However, when the number of concavities arranged in the rotational direction is set to a value other than a prime number, resonance easily occurs to cause a rotational accuracy to deteriorate. Therefore, it is better to set the number of concavities to a prime number of 3 or more because resonance does not easily occur and a high rotational accuracy is obtained.

In order to derive the dynamic-pressure effect of a bearing, it is necessary to adjust the level of the distribution of pores in the above concavities to range between a surface porosity of 2% and 30%. When adjusting the level to less than 2%, a problem occurs that lubricant cannot be sufficiently supplied to the vicinity of the deepest portion of a concavity. When adjusting the level to more than 30%, a problem occurs that a high-enough pressure cannot be obtained because pores become extremely large and lubricant osmoses into the inside of a bearing. In order to achieve the dynamic-pressure effect, it is necessary to set the depth of a concavity to 2 to 100 $\mu$m. When setting the depth to less than 2 $\mu$m, a complete dynamic-pressure effect cannot be expected because the a pressure to be produced lowers as a whole. When setting the depth to more than 100 $\mu$m, the dynamic-pressure effect is deteriorated because lubricant is not adequately supplied into a concavity and thus, the rotational accuracy of a bearing is deteriorated.

In the above embodiments 1 to 7, a single bearing is described. By using the bearing unit of any one of the above embodiments as the bearing unit for a motor used in an information equipment or a video-acoustic equipment, it is possible to provide an inexpensive motor having a high rotational accuracy and a high reliability.

As clarified by the description of the above embodiments, the invention of the first embodiment is an oil-impregnated sintered bearing constituted by forming an inner surface sliding together with a shaft on a bearing body made of a porous sintered alloy, wherein a part or the whole of said inner surface is formed into a tapered or tapered-like shape at the time of molding a green compact of the sintered alloy, a plurality of concavities are transferred to the tapered portion of the inner surface by press-fitting a pin formed with protrusions in the subsequent process, and concavities both ends of which are closed are formed on the sliding surface of the shaft by sizing the tapered portion straight at the time of sizing. Since the concavities making a superior dynamic-pressure effect can be formed in a simple process, it is possible to provide an inexpensive bearing unit having a high rotational accuracy and a high reliability.

Moreover, by simultaneously forming the concavities in the inner surface of a bearing at the time of green-compact molding and omitting press-fitting of a pin in the subsequent process, it is possible to provide an even more inexpensive bearing unit.

By using the bearing unit of the invention as motor bearing unit, it becomes possible to provide an inexpensive motor having a high rotation accuracy and a high reliability.

What is claimed is:

1. An oil-impregnated sintered bearing unit having an inner surface slidable together with a shaft on a bearing body of a porous sintered alloy, said bearing unit manufactured by a method comprising:

forming a part or the whole of said inner surface into a tapered or tapered-like shape at the time of molding a green compact of a sintered alloy;

transferring a plurality of concavities to a tapered portion of the inner surface by press-fitting a pin formed with protrusions; and forming concavities having ends that are closed on the sliding surface of the shaft by sizing the tapered portion straight at the time of sizing.

* * * * *